United States Patent [19]
Ostrom

[11] Patent Number: 5,311,901

[45] Date of Patent: May 17, 1994

[54] PRESSURE INTERRUPTER DEVICE

[76] Inventor: Charles R. Ostrom, 11802 Boxhill, Houston, Tex. 77066

[21] Appl. No.: 69,421

[22] Filed: Jun. 1, 1993

[51] Int. Cl.[5] ............................................. F16K 17/18
[52] U.S. Cl. .................................. 137/493.3; 303/9.62
[58] Field of Search ......................... 137/493.1–493.6; 303/9.61, 9.62

[56] References Cited

U.S. PATENT DOCUMENTS

| | | | |
|---|---|---|---|
| 2,016,278 | 10/1935 | Ehlers | 137/493.6 |
| 2,031,360 | 2/1936 | Boughton . | |
| 2,886,950 | 5/1959 | Hause . | |
| 3,499,688 | 3/1970 | Reynolds | 137/493.3 |
| 3,828,894 | 8/1974 | Crossman . | |
| 4,225,022 | 9/1980 | Belart . | |
| 4,404,803 | 9/1983 | Steffes . | |
| 4,496,033 | 1/1985 | Hall et al. . | |
| 4,628,957 | 12/1986 | Hofer | 137/493.3 |
| 4,641,891 | 2/1987 | Belart . | |
| 4,969,697 | 11/1990 | Lindenman | 137/493.3 X |

Primary Examiner—Robert G. Nilson
Attorney, Agent, or Firm—Kenneth H. Johnson; A. Bert Dallas

[57] ABSTRACT

The pressure interrupter device provides a simple and easy way to interrupt the pressure in a hydraulic system. A piston having an internal check valve is biased in an internal chamber by a spring. As the piston is moved against the spring by upstream hydraulic pressure, channels in the internal chamber walls are exposed to provide a flow bypass around the piston. The increased flow around the piston reduces the upstream pressure. When the upstream pressure is less than the force exerted by the spring force against the piston and the downstream pressure, the piston moves to a closed position, blocking the channels and stopping the fluid flow. This process is repeated many times at a rapid rate as long as there is a positive pressure upstream of the pressure interrupter device. The piston action operates to create a pulsating effect when the pressure upstream of the pressure interrupter device is greater than the downstream pressure. The pressure interrupter device may be used in any hydraulic system where pressure interruption is desired.

7 Claims, 3 Drawing Sheets

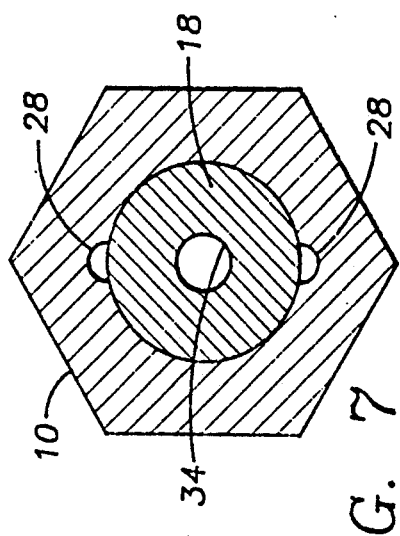
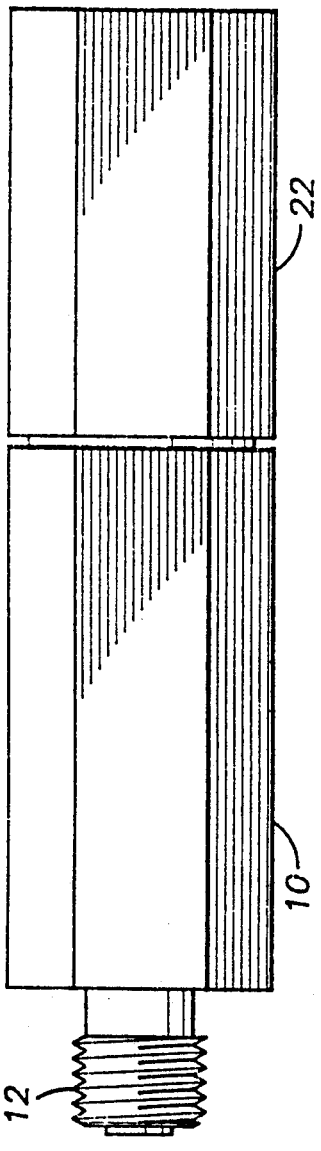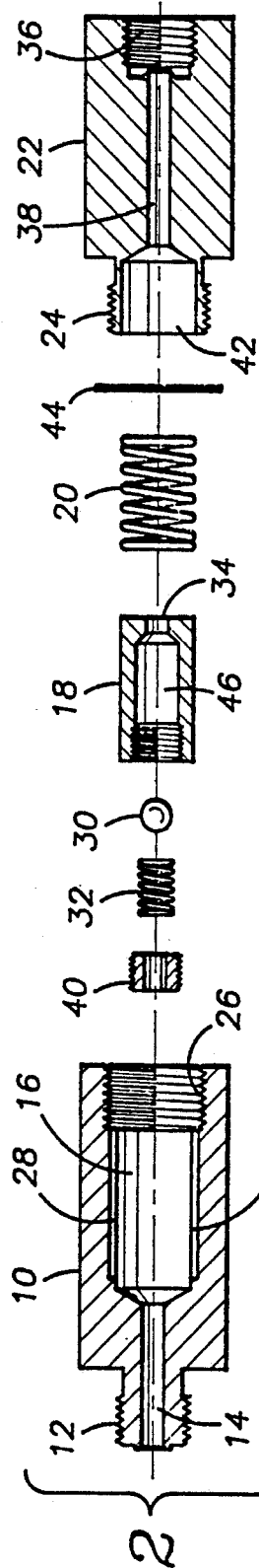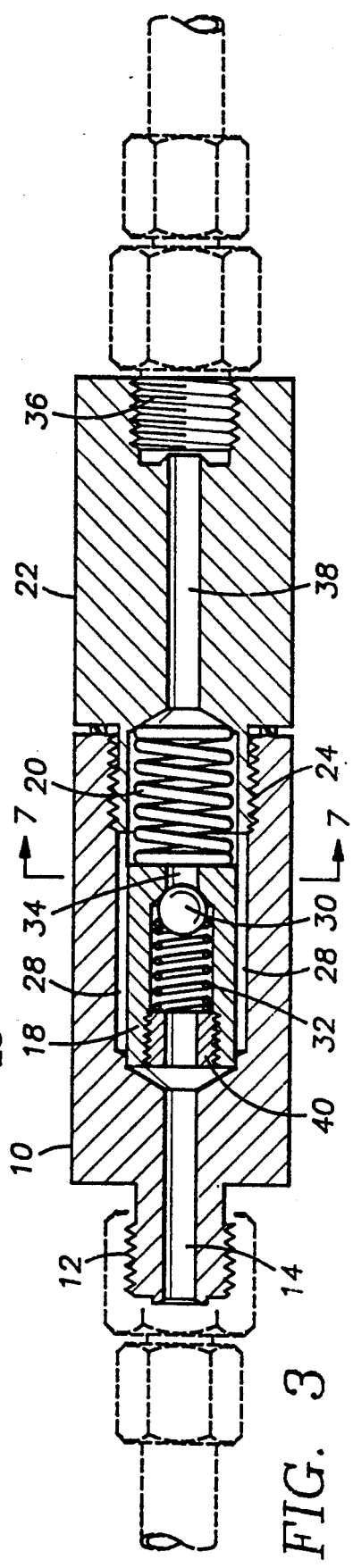

PRESSURE INTERRUPTER DEVICE

BACKGROUND OF THE INVENTION

1. Field of the Invention

This invention relates to an interrupter device for use in the flow of fluids. More particularly, the device interrupts the hydraulic fluid pressure in a hydraulic system to create a pulsating effect.

2. Related Art

Hydraulic systems have a wide range of applications, including hydraulic presses, lifting systems and braking systems. The use of hydraulically driven pistons to effect an actuating force is well known. In particularly, hydraulically driven pistons have widespread use in braking systems. These hydraulic systems provide a steady, continuous and reliable hydraulic pressure that is desirable for automobile braking systems.

Improvements in hydraulic braking systems tend to focus on improving the responsiveness and actuation of the system. These improvements usually involve the use of booster devices or dual piston hydraulic systems that provide a more reliable and continuous force to the braking mechanism.

U.S. Pat. No. 3,828,894 shows a telescopic brake piston and return mechanism for compensating for the wear of brake disks. Two interfitting pistons are received within a brake housing, the smaller piston is for the initial engagement with the brake disk and the larger for the working brake force.

U.S. Pat. No. 4,404,803 shows a hydraulic booster unit for a master brake cylinder unit. The unit provides a two way, two position valve which is connected to either a bypass line or a hydraulic line to the wheel brake cylinders.

U.S. Pat. No. 4,496,033 shows a dual piston actuator for an aircraft brake assembly. A pair of axially aligned pistons are mounted within the bore of a pressure housing. A primary piston responds to an increasing pressure and the secondary piston responds to a higher pressure, thereafter, the pistons operate in conjunction to provide an output force to a braking mechanism.

The present invention is distinguished from the related art, as the present invention provides a means for interrupting or pulsating the hydraulic pressure in a hydraulic system.

Conventional automobile braking systems have a major disadvantage of locking. If the driver brakes too hard on a slippery road, the wheels will lock and the automobile may go out of control. To solve this problem, some automobiles are now fitted with antilock braking systems. These systems can sense when one or more of the wheels is about to lock and reduce the braking effort to the wheel. Some earlier antilock systems used mechanical sensors to detect wheel-lock. Today, many automobiles are equipped with an electronic antilock system which are normally installed in the automobile at the factory and are usually quite expensive. For older model automobiles and automobiles which were purchased without the factory installed antilock braking systems, it is not cost effective to install an antilock braking system.

The present invention provides an inexpensive and easy to install pressure interrupter device, that may be installed in a hydraulic brake line to prevent locking of the braking mechanism.

An advantage of the present invention is to provide a simple, inexpensive and easy to install pressure interrupter device for hydraulic systems.

SUMMARY OF THE INVENTION

Briefly the present invention comprises a piston having an internal check valve is biased in an internal chamber by a spring. As the piston is moved against the spring by an upstream hydraulic pressure, channels in the internal chamber walls are exposed to provide a flow bypass around the piston. The increased flow around the piston reduces the upstream pressure. When the upstream pressure is less than the force exerted by the spring force against the piston and the downstream pressure, the piston moves to a closed position, blocking the channels and stopping the fluid flow. This process is repeated many times at a rapid rate as long as there is a positive pressure upstream of the pressure interrupter device, and as exerted by pressing on an automobile brake pedal. This piston action operates to create a pulsating effect when the pressure upstream of the pressure interrupter device is greater than the downstream pressure. A check valve mechanism within the piston allows flow equalization when the downstream pressure is greater than the upstream pressure.

The pressure interrupter device may be used in any hydraulic system where pressure interruption is desired. A preferred embodiment of the invention to prevent brake locking in hydraulic braking systems.

BRIEF DESCRIPTION OF THE DRAWINGS

FIG. 1 shows an assembled pressure interrupter device.

FIG. 2 shows an exploded view of the invention.

FIG. 3 shows a schematic view of the invention installed in an hydraulic line.

FIG. 7 is a cross sectional view of FIG. 3 along line 7.

DESCRIPTION OF THE PREFERRED EMBODIMENTS

Figure 4:
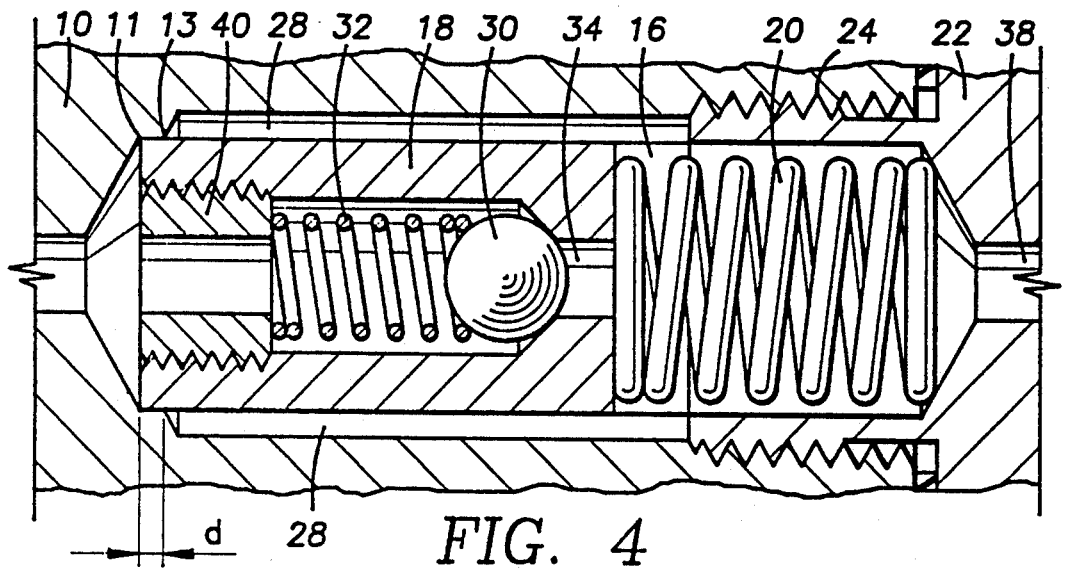
FIG. 4 shows a close-up schematic view of the invention with the piston in a closed position.

The same or similar components may have the same indicia in the drawings.

FIG. 1 shows an assembled pressure interrupter device. The pressure interrupter device is comprised of two sections, a body and an end cap 22.

FIG. 2 shows an exploded view of the pressure interrupter device. The body 10 comprises a threaded receptacle 26 connected to a chamber 16, that is connected to an external threaded member 12. A line 14 runs through the external threaded member 12 to join the chamber 16. The channels 28 are located on the walls of the chamber 16, beginning about ⅛ inch from where the line 14 and chamber 16 join and ending at the threaded receptacle 26. Typically, the channels 28 are located oppositely from one another and are about 1/16 inch in width.

The piston 18 is cylindrical in shape for insertion into the chamber 16. The spring 20 biases the piston 18 against the channel end 11 of the chamber 16, cutting off the flow of the hydraulic fluid through the chamber 16.

Figure 6:
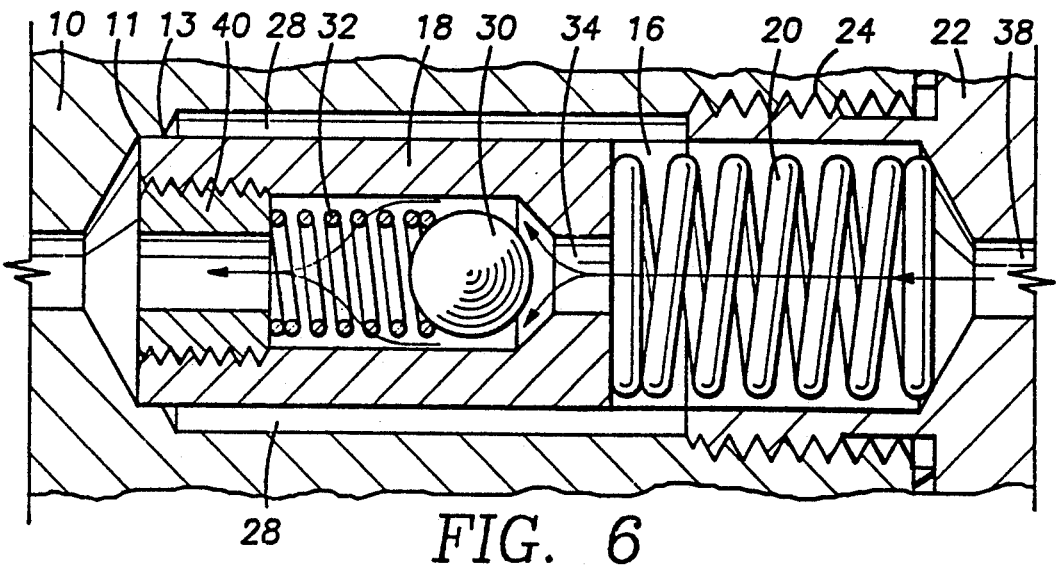
FIG. 6 shows a close-up schematic view of the invention with the ball valve in the open position.

The piston comprises a conduit 34 which allows the back flow of fluid through the ball valve 30, and through the channel 46 for flow into the line 14. A spring 32 located in the channel 46 biases the ball valve 30 against the conduit 34. The spring 32 and ball valve 30 are retained in the channel 46 by a fastener 40. A higher downstream pressure than the upstream pressure is required to actuate the internal ball valve 30. FIG. 6 shows back flow through the ball valve 30. When the downstream pressure is greater than the upstream pressure and the force exerted by the spring 32, the ball valve 30 opens, allowing the fluid to flow through the piston 18.

FIG. 2 shows the end cap 22 comprising an internal threaded member 36 connected to a channel 38, which is connected to an external threaded member 24. The internal threaded member 36 is of an appropriate size to allow connection to the brake lines found in most automobiles. A spring 20 is partially inserted into the internal cavity 42. The end cap 22 is connected by the external threaded member 24 to the threaded receptacle 26 of the body 10. A washer 44 is inserted on the external threaded member 24 to provide a good seal.

The pressure interrupter device may be used in any hydraulic system where pressure interruption is desired. An important application of the present invention is in hydraulic braking systems to prevent brake locking. The pressure interrupter device is installed in the hydraulic brake line between the master cylinder and wheel cylinder. FIG. 3 shows the external threaded member 12 connected to the master cylinder side of the brake line and the internal threaded member 36 connected to the braking mechanism side of the brake line. In a conventional automobile brake system, one interrupter would be inserted in the front brake line and one interrupter in the rear brake line.

Figure 5:
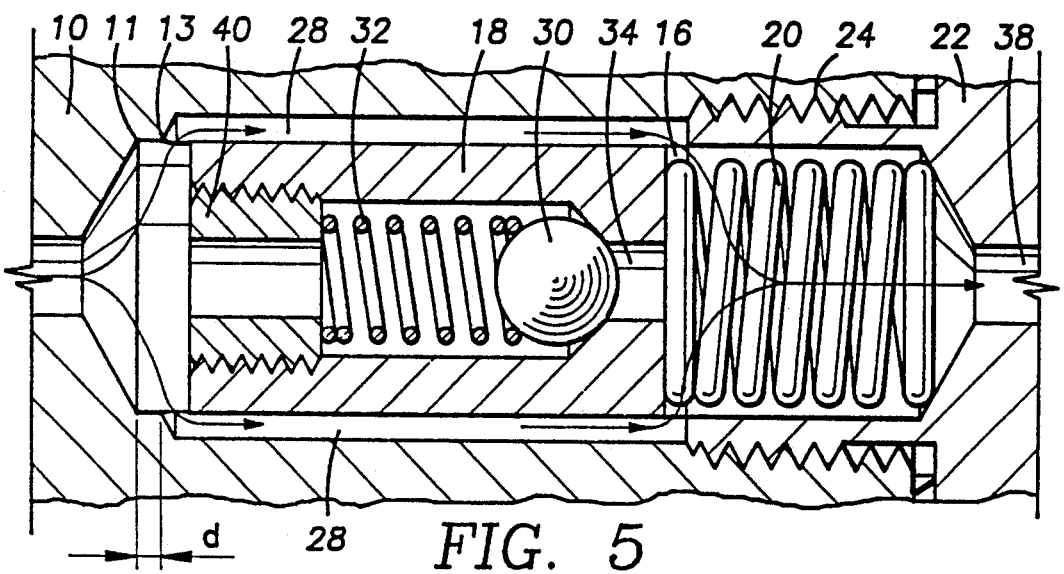
FIG. 5 shows a close-up schematic view of the invention with the piston in an open position.

When the brakes are applied, the master cylinder increases the pressure of the brake fluid and the brake fluid flows into the body 10 of the interrupter device. As the brake pedal is continually pushed, the master cylinder increases the pressure on the brake fluid. The piston 18 is normally in a closed position as shown in FIG. 4. However, when the pressure upstream of the interrupter device overcomes the downstream pressure and the force exerted by the spring 20, the piston 18 moves in the chamber 16 towards the end cap 22. The movement of the piston 18 increases the pressure of the brake fluid downstream of the piston 18. As the master cylinder increases the brake fluid pressure, the piston 18 continues to move toward the end cap 22. When the piston moves about distance d in the chamber 16, the channels 28 located in the wall of the chamber 16 are uncovered. FIG. 5 shows the channels 28 exposed, thereby providing a flow path around the piston 18. The flow of fluid through the channels 28 decreases the pressure upstream of the piston 18 such that the upstream pressure is no longer sufficient to overcome the downstream pressure and the force of the spring 20 on the piston 18. Therefore, the piston 18 will slide in the chamber 16 toward the external threaded member 12, blocking off the flow of fluid through the channels 28. This has the effect of interrupting the fluid pressure downstream of the interrupter device. Thus, preventing a prolonged high downstream pressure that would lock the braking mechanism. The piston 18 will remain in the closed position until the master cylinder exerts an upstream pressure that is larger than the downstream pressure and force exerted by the spring. This pressure equalization cycle repeats rapidly until pressure equalization has been achieved.

The period of the piston cycle may be adjusted by the distance between the channel end 11 and the entry 13 to the slot in the cylinder wall connecting down stream. As with electronic antilock systems, the pulsating is more rapid than can be achieved by the individual "pumping" the brakes. In any event, the present system is always operational each time the brakes are applied, thus providing a system that never allows the brakes to lock. The distance "d" between the channel end 11 and entry 13 is preferably from about 0.01 inch to $\frac{1}{4}$ inch, more preferably about 1/32-$\frac{1}{8}$ inch. A shorter "d" results in more rapid pulsing of the piston.

When braking is stopped, the pressure exerted by the master cylinder is reduced, lower than that of the wheel cylinder. The fluid flows from high pressure to low pressure across the interrupter device. The reverse flow through the interrupter device is accomplished by the ball valve 30. When the fluid pressure is great enough to overcome the force exerted by the spring 20, the fluid flows through the piston 18 to the line 14. The interrupter device allows for fluid flow in both directions depending on the pressure.

Figure 8:
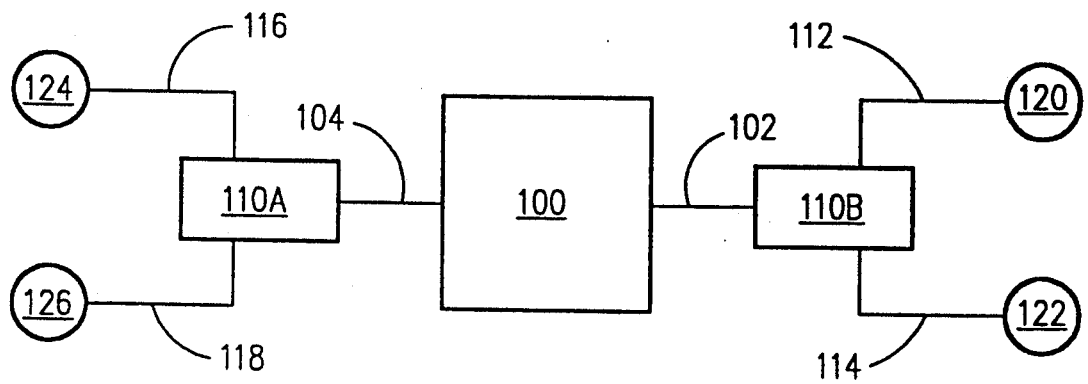
FIG. 8 is a schematic representation of a vehicle brake system with two interrupters installed.

FIG. 8 shows a schematic configuration in a vehicle brake system comprising the master cylinder 100 connected via lines 102 and 104 to interrupters 110B and 110A, respectively. Interrupter 110/B is connected via brake lines 112 and 114 to brake cylinder 120 and 122 respectively and interrupter 110A is connected to brakes 124 and 126 respectively via lines 116 and 118.

Figure 9:
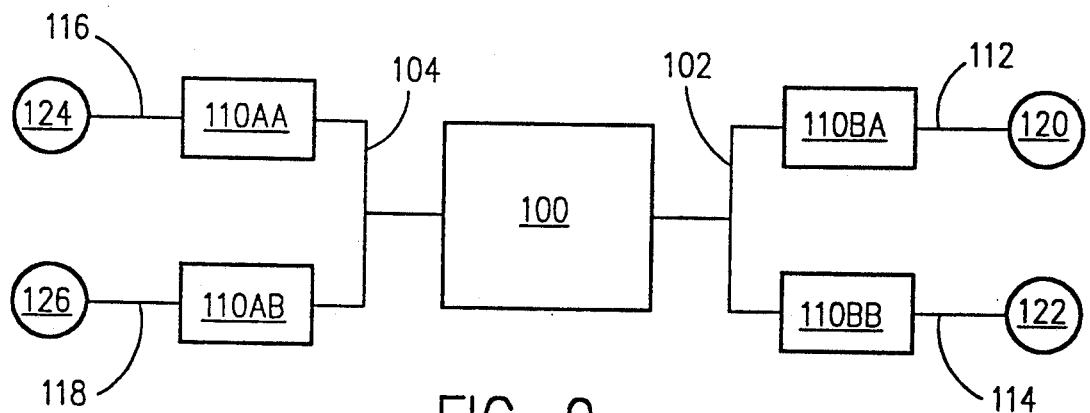
FIG. 9 is a schematic representation of a vehicle brake line with four interrupters installed.

Thus two brakes are operated by a single interrupter. A refined version is shown in FIG. 9 where the lines 102 and 104 are split into and two interrupters installed in parallel in each, 110BA and 110BB in split line 102 and 110AA and 110AB in split line 104. Each one of the interrupters then controls a single brake cylinder. In the present system each interrupter operates independently of each of the interrupters. However, by use of comparable component specifications in each interrupter in a system, substantially the same frequency and duration of pulsation may be achieved.

Application of pressure on the master cylinder will actuate the brake cylinder and the pulsation of the piston within the pressure interrupter.

The pressure interrupter device may be constructed of any material that is suitable. Suitable materials include metals such as brass, iron, and steel, or any plastic or polymeric material.

The pressure interrupter device may be of any shape that is desired. The preferred shape is generally cylindrical, however, a square, or triangular shape body and/or piston may be suitable.

The pressure device may be arranged in a series arrangement to provide a multiple pressure interruption effect.

What is claimed is:
1. A pressure interrupter device comprising:
   (a) a body having an internal axial chamber, an inlet end and a first distal end with connecting threads, said chamber having at least one axial channel disposed near and spaced a distance from the inlet end of said chamber;

(b) a piston slidably disposed within the internal axial chamber of said body, further comprising:
 (i) an internal axial channel and
 (ii) a pressure sensitive valve disposed within said internal axial chamber for allowing fluid flow through said piston toward said inlet end, said piston closing said inlet and preventing communication between said inlet and said axial channel until said piston has moved said distance;
(c) an end cap having an internal axial channel an outlet end and a second distal end with a connecting threads, the second distal end connected to the connecting threads of the first distal end of said body; and
(d) a biasing spring disposed within the internal axial chamber of said body between said end cap and said piston, for biasing said piston in said internal axial chamber toward said inlet.

2. The pressure interrupter according to claim 1 wherein said pressure sensitive valve comprises a ball biased by a spring inlet.

3. The pressure interrupter according to claim 1 wherein said channel is positioned from about 0.01 to ¼ inch below the inlet.

4. The pressure interrupter according to claim 5 wherein there are at least two of said channels.

5. The pressure interrupter according to claim 3 wherein said pressure sensitive valve comprises a ball biased by a spring.

6. The pressure interrupter according to claim 5 wherein said chamber is cylindrical.

7. The pressure interrupter according to claim 6 wherein there are at least two of said channels.

* * * * *